July 28, 1959          J. V. THOMAS          2,896,662

MULTIPLE DISTRIBUTION VALVE

Filed Sept. 7, 1956

INVENTOR.
JOHN V. THOMAS
BY
*Lyon & Lyon*
ATTORNEYS

United States Patent Office 2,896,662
Patented July 28, 1959

2,896,662

MULTIPLE DISTRIBUTION VALVE

John V. Thomas, Pasadena, Calif.

Application September 7, 1956, Serial No. 608,565

2 Claims. (Cl. 137—538)

This invention relates to multiple distribution valves and is a continuation-in-part of a previously filed application for "Multiple Distribution Valve," filed June 27, 1955, Serial No. 518,181, and now abandoned. Included in the objects of this invention are:

First, to provide a multiple distribution valve which is particularly adapted for use with tractor-drawn agricultural machines for applying liquid fertilizer or fumigants to the soil, and which is so arranged as to deliver equal quantities of liquid to a plurality of outlets or nozzles, each associated with a ground-engaging tine.

Second, to provide a multiple distribution valve wherein a cylindrical valve armature is provided with a plurality of radiating slits for distribution of fluid from a single supply to a plurality of outlets, and wherein means is provided to prevent axial bleeding of fluid between the radiating slits.

With the above and other objects in view, as may appear hereinafter, reference is directed to the accompanying drawings in which.

Figure 1:
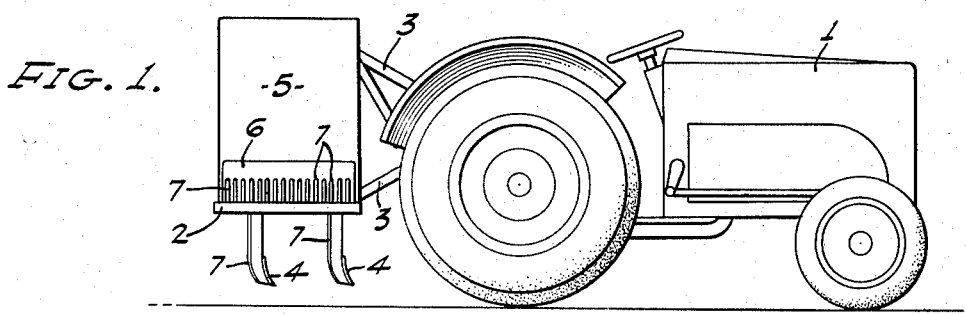
Figure 1 is a substantially diagrammatical view of a tractor, showing soil fumigant apparatus connected thereto and incorporating the multiple distribution valve.

The multiple distribution valve is intended primarily for use in conjunction with soil fumigating or soil fertilizing apparatus. Such apparatus is usually carried by a tractor 1 on a platform 2 connected with the tractor by a hitch assembly 3. Depending from the platform 2 are ground-engaging tines 4.

Mounted on the platform 2 is a reservoir 5 and a valve and pump housing 6. Distributor lines 7 lead from the housing 6 to each of the ground-engaging tines 4 so that the liquid fumigant or fertilizer may be discharged into the furrow made by each tine.

The construction so far described is conventional.

A large number of ground-engaging tines are used, the number depending upon the area of ground it is desired to treat in one pass of the tractor. It is not uncommon to have ten or twenty, or more tines. It is essential to the operation of such apparatus that the liquid be uniformly distributed to the ground-engaging tines, that is, each distributing line should receive the same quantity of liquid as the others. It is the purpose of the present invention to provide a distributing valve which will ensure such uniform distribution of liquid fumigant or fertilizer.

The multiple distribution valve includes a valve body 11 which is tubular and provided with a central bore 12. One end of the bore forms an inlet end 13 and is internally screw-threaded for connection to a supply line, not shown, which in turn is connected to a pump or other means, not shown, for supplying under pressure the liquid to be distributed.

The central bore 12 of the valve body 11 is intersected by banks or sets of distributor line outlets 14, 15, and 16. Three such sets are shown, however, more or less may be provided. The members of each set of outlets occupy a common plane, and the sets of outlets are offset axially a sufficient distance so that a distributor line may be connected to each outlet. Fitted within the central bore 12 is a liner 17 having ports 18, corresponding to the plurality of outlets.

Slidably mounted within the liner 17 is a valve armature 19 having a partition 20 near one end. At one side of the partition 20 the valve armature forms a hollow skirt 21 having banks of slots 22, 23, and 24, displaced axially in correspondence with the distributor line outlets. The slots extend axially and their leading edges are so arranged as to register simultaneously with the ports 18 leading to the outlets 14, 15, and 16.

Movement of the valve armature 19 towards its closed position with the slots out of registry with the outlets is limited by a stop ring 25, which is fitted in one end of the liner 17. The valve armature is prevented from rotation by means of a key screw 26 which extends radially through the valve body 11 and line 17 into an axially directed key slot 27 formed in the wall of the valve armature at the opposite side thereof from the skirt 21.

The end of the valve body 11, remote from the inlet end 13, receives a screw plug 28. A spring 29 is interposed between the screw plug 28 and a disc 30 which is mounted on a fulcrum pin 31 projecting upwardly from the partition 20 so as to urge the valve armature 19 toward the inlet end 13. Thus, under normal conditions, the distributor valve is closed, with the slots out of registry with the outlets. A vent port 32 is provided in the plug 28 or in the wall of the valve body 11 so that the chamber containing the spring 29 is at atmospheric pressure.

Figure 4:
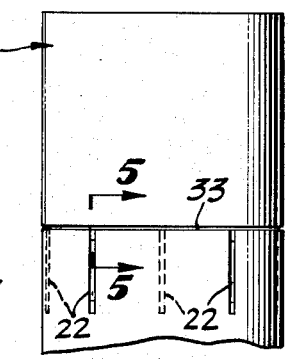
Fig. 4 is an enlarged fragmentary elevational view of the valve armature, showing one means of preventing axial bleeding of fluid.
Figure 5:
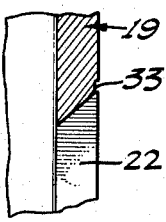
Fig. 5 is a fragmentary exaggerated sectional view thereof through 5—5 of Fig. 4.
Figure 6:
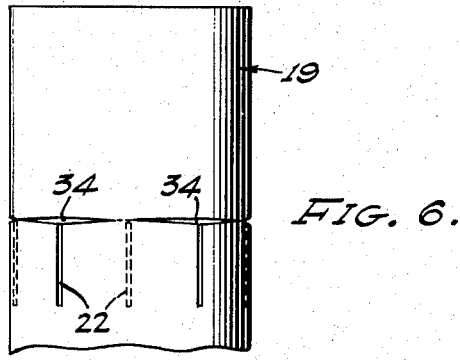
Fig. 6 is an enlarged fragmentary sectional view of the valve armature similar to Fig. 4, showing a modified form of means to prevent axial bleeding of fluid.

The chemicals handled by the multiple distribution valve are often highly active or corrosive; therefore, it is essential that none of the fluid bleed to the low pressure or upper end of the valve armature. This may be prevented by a very small annular groove 33 immediately above the uppermost ring of slits 22, as shown best in Figs. 4 and 5. For example, a groove only .005 inch deep by .050 inch wide is quite adequate. Such a groove diverts into the nearest slit any fluid which might otherwise tend to flow axially to the end of the valve armature.

Alternatively, a ring of groove segments 34 may be formed above the slits 22. The groove segments may attenuate toward their extremities and terminate in close proximity to each other. With this arrangement, lateral flow between the slits is minimized.

Figure 2:
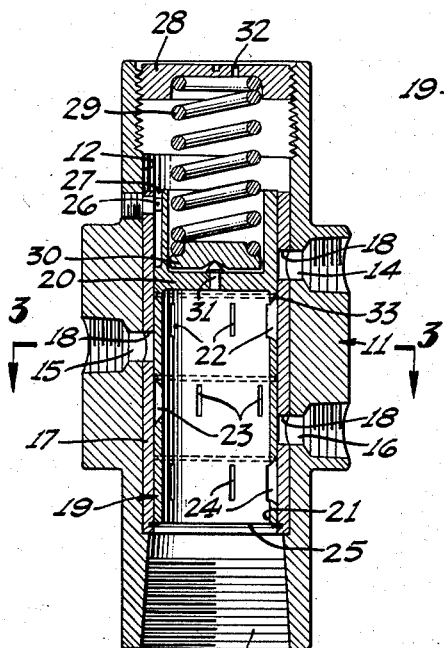
Fig. 2 is a longitudinal sectional view of the multiple distribution valve, taken through 2—2 of Fig. 3.
Figure 3:
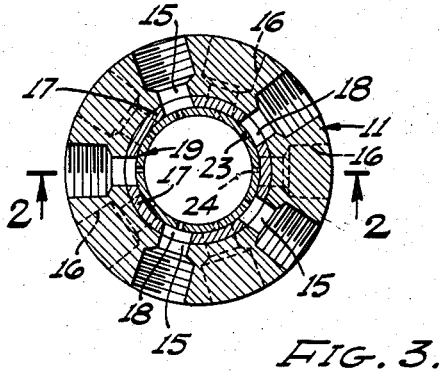
Fig. 3 is a transverse sectional view thereof, taken through 3—3 of Fig. 2.

Operation of the multiple distribution valve is as follows:

Under normal conditions, the valve is closed, as shown in Fig. 2. Upon application of fluid pressure, the valve armature 19 is moved against the action of the spring 29, bringing the leading edges of the slots simultaneously into registry with the ports 18.

The amount of discharge of liquid from each of the outlets is dependent upon the pressure at which the liquid is supplied so that by regulating the pressure of the liquid as supplied, the rate of flow in each of the distributor lines may be controlled. Irrespective of the rate of flow through the distributor lines, their rates are substantially equal to each other; thus effecting uniform supply of the liquid to the furrows formed by the plurality of ground-engaging tines 4.

By reason of the annular groove 33 or the segmental grooves 34, bleeding of fluid to the low pressure end of the valve armature is prevented.

While a particular embodiment of this invention has been shown and described, it is not intended to limit the same to the exact details of the construction set forth, and it embraces such changes, modifications, and equivalents of the parts and their formation and arrangement as come within the purview of the appended claims.

What is claimed is:

1. A multiple distribution valve, comprising in combination: a tubular valve body structure having an inlet at one axial end and a series of radiating outlets, a hollow valve element slidable in said valve body, said valve element being closed at one end and having a skirt directed toward said inlet, said skirt having a plurality of axially extending slits extending therethrough intermediate its ends so disposed and oriented to register simultaneously with said outlets upon axial movement of said valve element, yieldable means acting against the closed end of the valve element tending to urge said valve element toward said inlet to dispose said slits out of registry wth said outlets, the closed end of said valve element forming a pressure area responsive to pressure of fluid entering the inlet to move said slits into a degree of registry with said outlets corresponding to the pressure of the entering fluid, the valve element having a continuous annular groove in the outer surface thereof intersecting each one of the slits at the end thereof remote from the inlet for diverting axial leakage of fluid between the body structure and the valve element into said slits.

2. The combination set forth in claim 1 in which the body structure has a plurality of axially spaced series of radiating outlets and wherein the hollow valve element has a plurality of axially spaced sets of slits, the axial spacing of the sets of slits being equal to the axial spacing of the outlets, and wherein an annular leakage diverting groove is provided for each set of slits.

References Cited in the file of this patent

UNITED STATES PATENTS

| | | |
|---|---|---|
| 98,322 | Warren | Dec. 28, 1869 |
| 254,004 | Green et al. | Feb. 21, 1882 |
| 1,820,653 | Ernst | Aug. 25, 1931 |
| 2,085,982 | Johnson | July 6, 1937 |
| 2,664,910 | Boyd et al. | Jan. 5, 1954 |